United States Patent

Weir

[11] Patent Number: 5,851,090
[45] Date of Patent: Dec. 22, 1998

[54] RECONDITIONING PLANING TOOL

[76] Inventor: Douglas S. Weir, P.O. Box 1084, Huntley, Ill. 60142

[21] Appl. No.: 466,369

[22] Filed: Jun. 6, 1995

[51] Int. Cl.⁶ .................................................... B23D 1/08
[52] U.S. Cl. ......................... 409/293; 409/298; 409/317; 409/345
[58] Field of Search ............................... 409/293, 297, 409/298, 345, 303, 317, 326, 181, 182

[56] References Cited

U.S. PATENT DOCUMENTS

| | | |
|---|---|---|
| 144,851 | 11/1873 | Larer . |
| 445,644 | 2/1891 | Kellow . |
| 1,416,789 | 5/1922 | Butler et al. ............................. 409/326 |
| 1,471,864 | 10/1923 | Sentou et al. . |
| 1,501,854 | 7/1924 | Klohe . |
| 1,561,061 | 11/1925 | Pallady . |
| 1,641,555 | 9/1927 | Shook . |
| 1,775,963 | 9/1930 | McCarrol ................................ 409/326 |
| 1,878,138 | 9/1932 | Herrmann ........................... 409/293 X |
| 2,015,955 | 10/1935 | Morton ....................................... 90/38 |
| 2,204,874 | 6/1940 | Walter ................................ 409/345 X |
| 2,582,983 | 1/1952 | Golden ....................................... 29/96 |
| 2,987,970 | 6/1961 | Watson ................................... 409/181 |
| 3,398,613 | 8/1968 | Gallotti ......................................... 83/3 |
| 3,399,585 | 9/1968 | Ahlert ........................................... 83/3 |
| 3,768,293 | 10/1973 | Ruesch ...................................... 72/203 |
| 4,132,254 | 1/1979 | Shockovsky ........................ 409/182 X |
| 4,162,565 | 7/1979 | Rubenzer ..................................... 29/33 |
| 4,443,143 | 4/1984 | Asari et al. ........................ 409/298 X |
| 4,583,895 | 4/1986 | Theurer .................................. 409/295 |
| 4,608,756 | 9/1986 | Sharon ..................................... 30/287 |
| 4,777,707 | 10/1988 | Kirscher ..................................... 29/33 |
| 5,176,478 | 1/1993 | Munch ............................... 409/181 X |

FOREIGN PATENT DOCUMENTS 633564   12/1949   United Kingdom .................. 409/326

*Primary Examiner*—Andrea L. Pitts
*Assistant Examiner*—Henry W. H. Tsai
*Attorney, Agent, or Firm*—Burkhart & Burkhart; Anne K. Burkhart; Patrick N. Burkhart

[57] ABSTRACT

A planing device for planing a first, movable surface of a machine is set forth. The machine includes a second surface from which the first, movable surface can be retracted. The planing device includes a base and a planing assembly. The base is slidably connected to the second surface and partially seated in an interspace formed between the first and second surfaces. The planing assembly includes a stationary planing tool and is connected to the base.

19 Claims, 3 Drawing Sheets

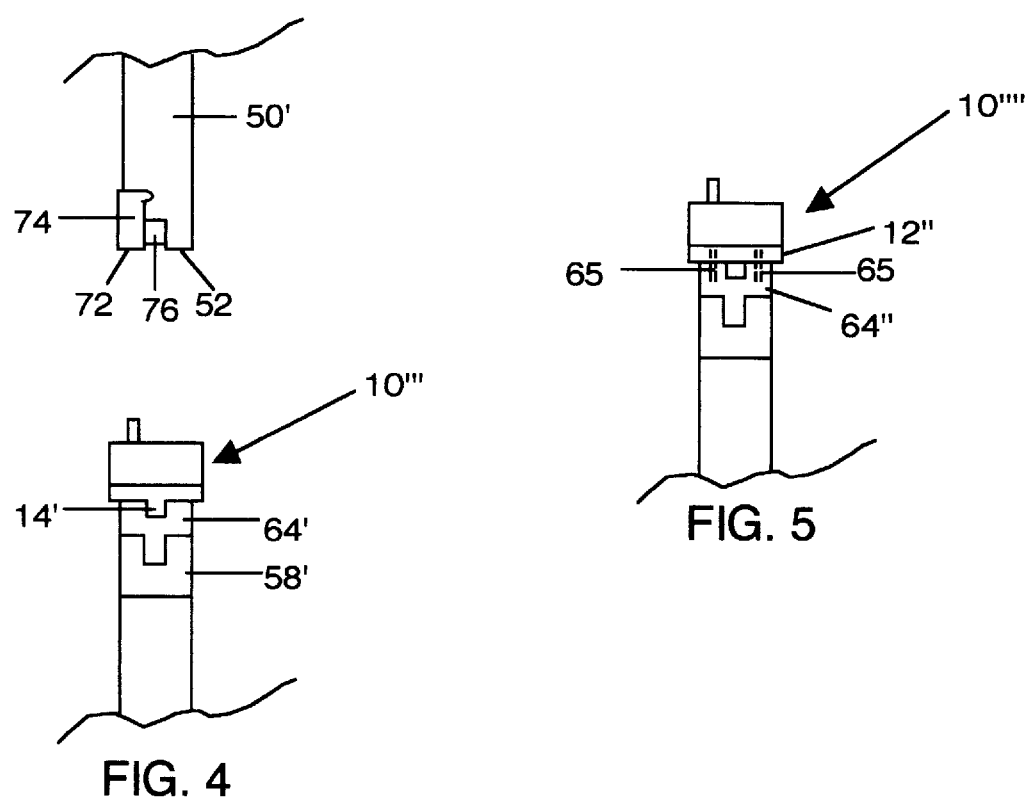

RECONDITIONING PLANING TOOL

TECHNICAL FIELD

The present invention relates to a planing device. More specifically, the present invention relates to a planing device for planing a movable surface of a machine.

BACKGROUND

Machines are known that form or stamp out component parts. Typically the machines include a movable surface that imparts an impact force sufficient to form or stamp out component parts during a downstroke of the movable surface.

One known machine having such a movable surface is a press brake. The press brake can be used, for example, to bend sheet metal ranging in thickness from approximately 0.015 inches to more than 1.0 inches. In set-up, an upper ram of the press brake is adjusted downwardly toward a lower ram of the press brake into a starting position. A metal sheet is then inserted in an interspace formed between the upper ram and the lower ram. The upper ram is then lowered by a downstroke of the machine. As a forming punch secured to the upper ram contacts the metal sheet, the force generated by the downstroke of the upper ram is imparted to the metal sheet thereby bending the metal sheet.

If downward adjustment of the upper ram during set-up of the press brake is excessive, then damage (in the form of irregularities such as dents) can occur to horizontal press brake surfaces. The dents are caused from the upper punch being imbedded in the top ram and the removeable clamp area, which secures the forming punch to the upper ram.

Where the horizontal surfaces are damaged, shims must be installed to compensate for the damage to the surfaces, which increases set-up time for operating the press brake, and can reduce the quality of a metal sheet if the precise number of additional shims are not correctly determined prior to operating the press brake.

Thus, where one or both of the horizontal surfaces are damaged it becomes difficult to accurately bend good quality parts.

It is known to disassemble the press brake and take the massive upper ram to an outside shop where damage to the horizontal surface of the upper ram can be repaired. However, disassembling the press brake is extremely time consuming and costly, since the electrical and mechanical connections of the press brake must be disassembled by a certified technician. Further, considerable down time results where the press brake is disassembled to remove the upper ram, and where the upper ram is repaired in the outside shop.

It is known to avoid disassembling the press brake by providing a motorized milling machine. The motorized milling machine can be employed to grind the upper horizontal and lower horizontal surfaces of the press brake. Such milling machines are described, for example, in U.S. Pat. No. 4,162,565, issued 31 Jul. 1979 to Rubenzer and in U.S. Pat. No. 4,777,707 issued 18 Oct. 1988 to Kirscher.

However, the known milling machines involve costly reconditioning of horizontal surfaces of the press brake. Thus, as the surfaces begin to incur damage there still exists the need to use shims to compensate for damaged regions of the horizontal surfaces, until the press brake is sufficiently worn to require full reconditioning. Therefore, the known milling machines fail to provide a cost-effective, portable planing device that can be employed by brake press owners or operators whenever damage to the upper horizontal surfaces occurs. Further, the known milling machines fail to avoid the costs and downtime associated with motor breakdowns of the milling machines since the known milling machines are motor driven.

SUMMARY OF THE INVENTION

A planing device for planing a first, movable surface of a machine is disclosed. The machine includes a second surface from which the first, movable surface can be retracted. The planing device includes a base and a planing assembly. The base is slidably connected to the second surface and partially seated in an interspace formed between the first and second surfaces. The planing assembly, which includes a stationary planing tool, is connected to the base.

Also disclosed is a method of planing a first, movable surface of a machine including the following steps. A planing device is provided within a plane of movement of the movable surface. A motion source is attached to the planing device. Uneven areas are scraped from the movable surface with a stationary cutting edge of the planing device while the planing device is pulled through the plane of movement of the movable surface with the motion source.

Other objects and advantages will become apparent upon reference to the accompanying description when taken in conjunction with the following drawings.

BRIEF DESCRIPTION OF THE DRAWINGS

FIG. 4 is a side schematic view, partially broken away, and taken along lines IV—IV of FIG. 3.

FIG. 5 is a side schematic view, partially broken away, of the planing device of FIG. 2.

DETAILED DESCRIPTION OF THE PREFERRED EMBODIMENTS

Figure 1:
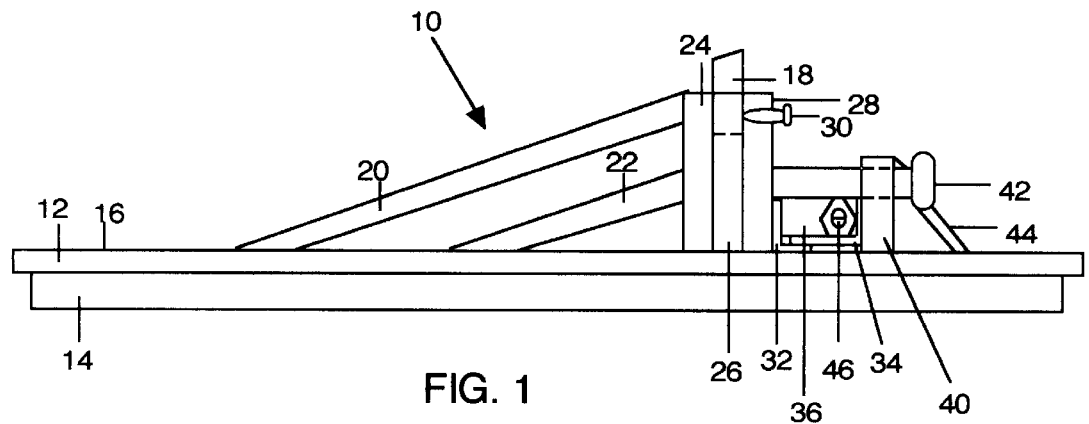
FIG. 1 is a side schematic view of a planing device.

FIG. 1 illustrates an embodiment of a planing device 10 constructed in accordance with the teachings of the present invention. The planing device 10 includes a base 12. The base 12 can be formed, for example, of sheet plate, bar stock or any other suitable material having suitable dimensions for planing a particular type of machine. A tang, or tongue, 14 formed of, for example, a steel bar and having suitable dimensions can be connected to and extending below the base 12 for slidably connecting the base 12 to a surface of a machine. Alternatively, the base 12' can be connected with bolts (illustrated in FIG. 5) through bores 15, illustrated in FIG. 2, to a sliding member, such as a die shoe 64 illustrated in FIG. 3. Further, any suitable device can be provided between the base 12 and the surface of the machine for slidably connecting the base 12 to the surface of the machine.

A planing assembly is connected to an upper surface 16 of the base 12. The planing assembly includes a suitable stationary planing tool, or cutting bit, such as a lathe bit 18 illustrated in FIG. 1. The planing assembly further includes a cutting bit support assembly and an adjustment assembly.

The cutting bit support assembly includes legs 20, 22, and a back stop 24. The legs 20, 22 form a rigid, angled connection between the upper surface 16 of the base 12 and the back stop 24. The cutting bit support assembly also includes bit side bars 26, a bit tapped bar 28, and a cap screw 30.

Figure 2:
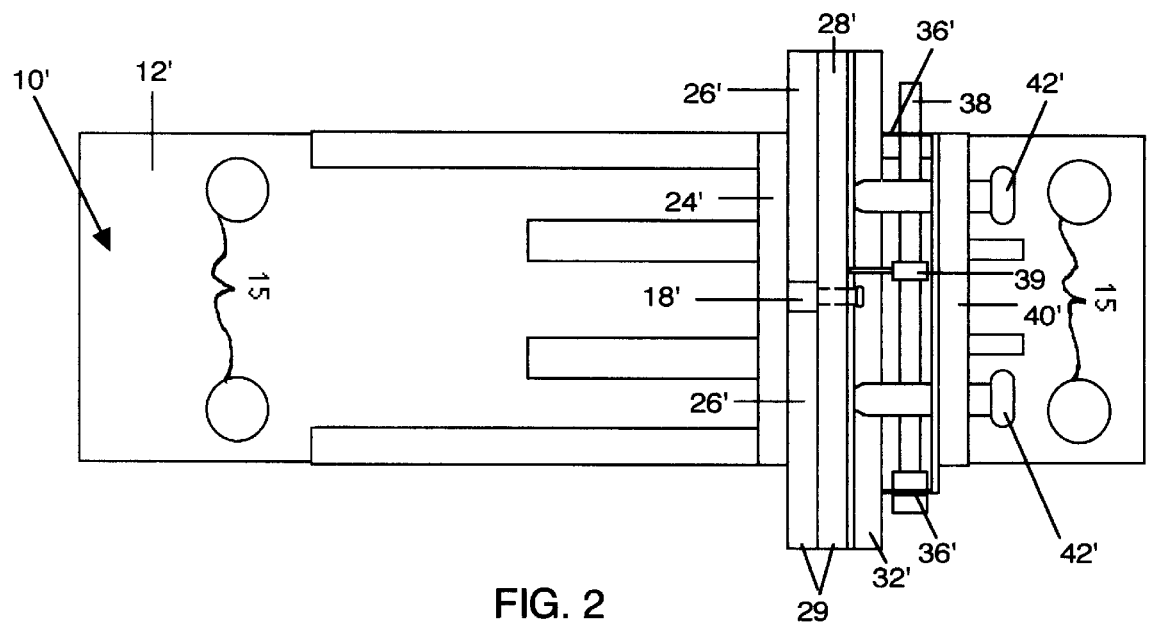
FIG. 2 is a top schematic view of a planing device.

As illustrated in FIG. 2, the bit side bars 26' are adapted to receive lathe bit 18', and are secured between the back stop 24' and the bit tapped bar 28'. Further, the bit side bars 26' are fixedly connected to the bit tapped bar 28' in a suitable manner to form a cutting bit assembly 29. For example, where the bit side bars 26' and the bit tapped bar 28' are formed of steel bars, the bit side bars 26' and the bit tapped bar 28' can be welded together to form the cutting bit assembly 29. The bit tapped bar 28' includes a bore (not shown) adapted to receive cap screw 30'. The combined elements of the cutting bit support assembly firmly hold the lathe bit 18' in a stationary position while the lathe bit 18' scrapes uneven areas from a movable machine surface, as discussed in detail with respect to FIG. 3 below.

The adjustment assembly provides for lateral adjustment of the lathe bit 18'. The adjustment assembly includes an angle 32, angled flat stock 34, rod bars 36, threaded rod 38, threaded nut 39, bolt bar 40, bolts 42 and gussets 44. The angle 32 is fixedly connected to the bit tapped bar 28'. The angled flat stock 34 is disposed over the angle 32 and fixedly connected to the bolt bar 40. The rod bars 361 are connected to opposite ends of the angled flat stock 34, and include bores (not shown) adapted to receive the threaded rod 38, illustrated in FIG. 2. The bolt bar 40 is vertically arranged on the upper surface 16 of the base 12, and fixedly connected to the angled flat stock 34. The bolt bar 40' includes bores (not shown) adapted to receive the bolts 42'. The threaded rod 38 is threaded through the threaded nut 39. The threaded nut 39 is fixedly connected to at least one of the angle 32' and the bit tapped bar 28'.

To operate the adjustment assembly, the bolts 42' are rotated counter clockwise, or outwardly from a secured position illustrated in FIG. 2, wherein the bolts 42' are tightened against the cutting bit assembly 29 to secure the cutting bit assembly 29 against the back stop 24'. A head 46, illustrated in FIG. 1, of threaded rod 38 is then turned, thereby rotating the threaded rod 38 through the threaded nut 39, and moving the threaded nut 39, the cutting bit assembly 29, and the lathe bit 18' until the desired lateral position of the lathe bit 18' is attained. The bolts 42' are then tightened through the bolt bar 40' until the cutting bit assembly 29 is in the secured position.

A planing device constructed in accordance with the teachings of the present invention provides a portable, and economical device for planing machine surfaces, such as movable machine surfaces. One conventional machine having a movable machine surface is a press brake 48, illustrated schematically in FIG. 3. The press brake 48 includes an upper ram 50 having a first movable surface 52, illustrated in FIG. 4. The press brake also includes a fixed lower ram 54, and a fixed upper housing 56. The fixed upper housing 56 houses the drive mechanisms that provide the upward and downward movement of the upper ram 50.

In order to slidably mount a planing device 10" on the press brake 48, a long die shoe 58 is mounted to the lower ram 54 either by machine screws (not shown) threaded through bores, conventionally provided in the lower ram 54 to secure die shoes during operation of the press brake 48, or by stepped offset brackets (not shown) bolted to the long shoe 58 and threaded tightly against the lower ram 54. The length of the die shoe 58 can be selected to ensure that the shoe 58 will extend sufficiently beyond the ends 60, 62 of the lower ram 54 to permit the planing device 10" to be positioned substantially outside a plane of movement, indicated by the arrows in FIG. 3, of the upper ram 50. Selecting the length of the shoe 58 in this manner reduces the risk of damage to the planing device 10" while the upper ram 50 is moved into a planing position, and prevents the planing device 10" from falling off end 62 of the lower ram 54.

Next, the die shoe 64, which is shorter than the shoe 58, is slidably mounted to the shoe 58. A tang 14' (illustrated in FIG. 4) of the planing device 10" can then be secured to the shoe 64' by machine screws (not shown) threaded through bores, conventionally provided in die shoes, through the shoe 64'. Alternatively, the base 12" of the planing device 10"" can then be bolted to the shoe 64" with bolts 65, as illustrated in FIG. 5.

Figure 3:
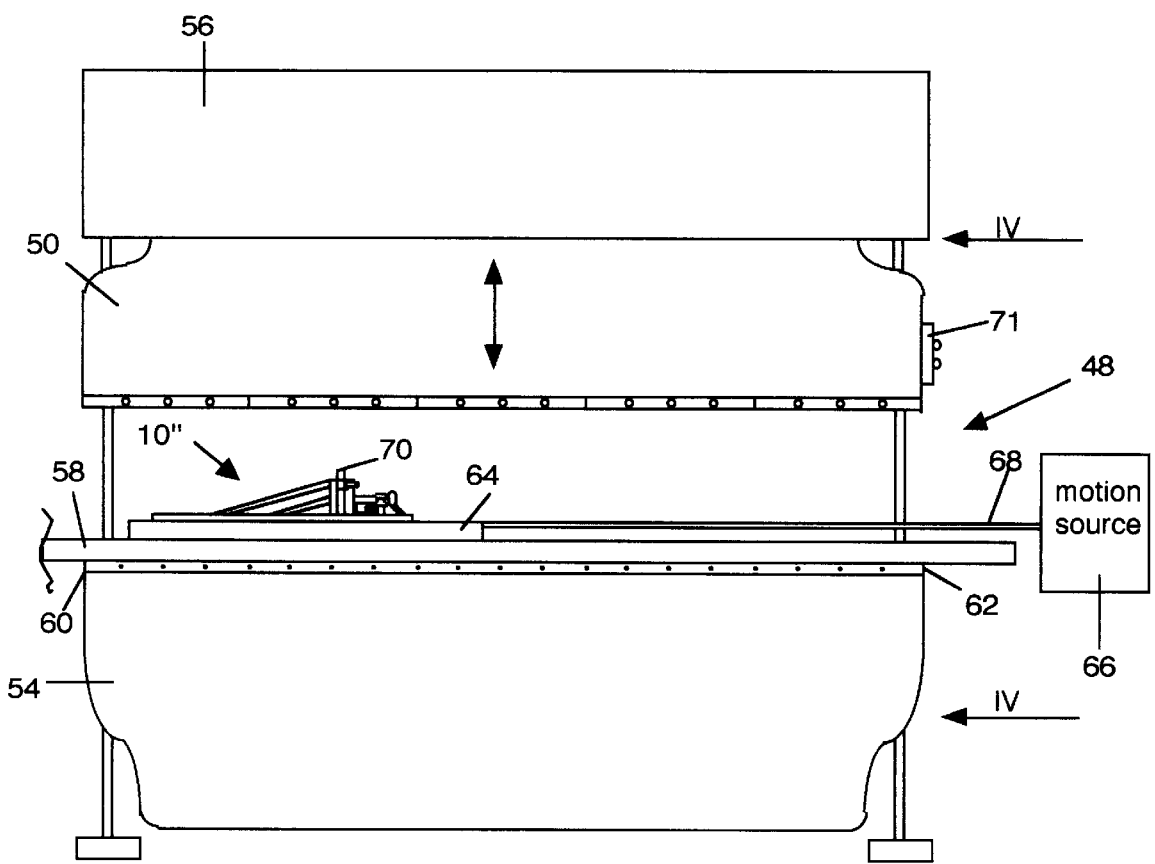
FIG. 3 is a front schematic view of a press brake, wherein the planing device of FIG. 1 is slidably connected to a second surface of the press brake.

Die shoe 64 is then connected to a suitable motion source 66, such as a fork lift or a motor, with a suitable connecting mechanism 68, such as a connecting bar, a motor chain, or a worm drive method using threaded rods, as illustrated in FIG. 3.

The upper ram 50 can then be moved into a planing position by activating a fine up/down adjustment assembly 71 of the press brake 48, illustrated in FIG. 3. As the motion source 66 pulls the planing device 10" through the plane of movement of the upper ram 50, a cutting edge 70 of the planing device 10" scrapes uneven areas from the upper ram 50, thereby planing the surface 52 of the upper ram 50. The planing device 10" can also plane a surface 72 (illustrated in FIG. 4) of a removable clamp 74 mounted on the upper ram 50.

As illustrated in FIG. 4, a spacer 76 of a suitable length can be secured to the upper ram 50' by tightening the clamp 74 to ensure proper spacing between the surfaces 52 and 72 while planing the surfaces 52 and 72. One suitable length for the spacer 76 is the length of the upper ram 50'.

A method of planing a first, movable surface of a machine includes the following steps. A planing device is provided within a plane of movement of the movable surface. A motion source is attached to the planing device. Uneven areas are scraped from the movable surface with a stationary cutting edge of the planing device while the planing device is pulled through the plane of movement of the movable surface with the motion source.

The planing device is suitable for planing a machine, or other surfaces that have been damaged. However, the planing device can also plane a stationary machine or other surface, if desired, by adjusting the height of the device in general and of the lathe bit in particular, provided that the planing device can slide across a machine or other surface such that the cutting bit, or lathe bit can plane a worn surface.

Although the present invention has been described with reference to specific embodiments, those of skill in the art will recognize that changes may be made thereto without departing from the scope and spirit of the invention as set forth in the appended claims.

I claim as my invention:

1. In combination, a reconditioning planing device in association with a machine to be reconditioned, the combination comprising the following:

a first, movable horizontal upper surface on the machine, the machine including a second surface beneath and substantially parallel to the first surface and from which the first, movable surface can be retracted;

the planing device including a base slidably connected to the second surface and seated in an interspace formed between the first and second surfaces; and planing means, including a stationary planing tool and connected to the base, for planing the first, movable surface, the planing means in operation being movable in a direction transverse to the normal direction of movement of the first, movable surface.

2. A planing device according to claim 1, further comprising:

projection means, removably connected to the base and slidably connected to the second surface, for enabling sliding movement of the planing device.

3. A planing device according to claim 1, the stationery planing tool of the planing means further comprising:

a cutting bit support assembly disposed over the base and connected to a cutting bit.

4. A planing device according to claim 1, the stationery planing tool of the planing means further comprising:

an adjustment assembly disposed over the base and connected to a cutting bit.

5. A planing device according to claim 2, further comprising:

a motion source connected to the projection means.

6. A planing device according to claim 1, the stationary planing tool of the planing means further comprising:

a cutting bit having a cutting edge, wherein the cutting edge of the cutting bit is maintained at a fixed angle with respect to a plane of movement of the first, movable surface while the planing device planes the first, movable surface.

7. In combination, a reconditioning planing device in association with a machine to be reconditioned, the combination comprising the following:

a first surface on the machine;

the machine having a second surface disposed beneath and substantially parallel to the first surface, and a substantially continuous concavity in the second surface, the planing device including a base connected to a tang removably and slidably disposed in the concavity and a planing assembly provided over and connected to the base, the planing assembly in operation being located between the first and second surfaces.

8. A planing device according to claim 7, the planing assembly further comprising:

a stationary cutting tool.

9. A planing device according to claim 8, the planing assembly further comprising:

means for securing the stationary cutting tool in a substantially perpendicular position with respect to the first surface of the machine.

10. A planing device according to claim 8, the planing assembly further comprising:

adjustment assembly means for horizontally adjusting the stationary cutting tool with respect to the first surface of the machine.

11. A planing device according to claim 7, further comprising:

means for sliding the tang within the concavity of the second surface.

12. A planing device according to claim 11, wherein the machine is a press brake, the means for sliding further comprising:

a removable shoe having an upper surface and a lower surface, with a continuous groove on the upper surface;

a base tang connected to and extending below the base and removably mounted in the groove of the shoe; and the tang extending below the lower surface of the shoe, wherein the tang is slidably mounted in the concavity.

13. A planing device according to claim 12, the means for sliding further comprising:

a connecting bar connected to the removable shoe and a fork lift connected to the connecting bar.

14. A planing device according to claim 11, the means for sliding the tang further comprising:

a drive chain connected to the planing device and a motor connected to the drive chain.

15. A planing device according to claim 7, the planing assembly further comprising:

a cutting bit connected to both a cutting bit support assembly and an adjustment assembly.

16. A planing device according to claim 7, the planing assembly further comprising:

a cutting bit having a cutting edge, wherein the cutting edge of the cutting bit is maintained at a fixed angle with respect to a plane of movement of the first surface while the planing device planes the first surface.

17. A planing device according to claim 7, wherein the machine is a press brake, further comprising:

a first shoe removably connected to a lower ram of the press brake;

a second shoe removably and slidably seated in the first removable shoe, the tang connected to and extending below the second shoe; and a bore provided through the base and adapted to receive a bolt for securing the base to the second shoe, wherein the first removable shoe is longer than the second removable shoe.

18. A planing device according to claim 7, wherein the base is substantially rectangular, and wherein the planing assembly includes a cutting bit securely positioned over and disposed substantially perpendicular to the base.

19. A reconditioning planing device for planing a first, movable ram surface of a press brake, the press brake including a second surface from which the first, movable surface can be retracted, the planing device comprising the following:

a base seated in an interspace formed between the first and second surfaces;

a tang connected to and extending below the base;

a removable die shoe slidably connected to the second surface and having an upper continuous groove adapted to receive the tang of the base;

a planing assembly including a cutting bit connected to a cutting bit support assembly and to an adjustment assembly, both the cutting bit support assembly and the adjustment assembly disposed over and connected to the base; and the cutting bit having a cutting edge, wherein the cutting edge of the cutting bit is maintained at a fixed angle with respect to a plane of movement of the first, movable surface while the planing device planes the first, movable surface.

* * * * *